(12) United States Patent
Iwatani

(10) Patent No.: US 6,271,649 B1
(45) Date of Patent: Aug. 7, 2001

(54) CONTROL APPARATUS FOR VEHICLE AC GENERATOR

(75) Inventor: Shiro Iwatani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/509,492

(22) PCT Filed: Nov. 18, 1998

(86) PCT No.: PCT/JP98/05185

§ 371 Date: Mar. 29, 2000

§ 102(e) Date: Mar. 29, 2000

(87) PCT Pub. No.: WO00/30236

PCT Pub. Date: May 25, 2000

(51) Int. Cl.⁷ .................... H02J 7/24; H02P 9/30
(52) U.S. Cl. ............................... 322/29; 322/25
(58) Field of Search .................. 322/7, 28, 29, 322/25, 61, 64

(56) References Cited

U.S. PATENT DOCUMENTS

| | | | |
|---|---|---|---|
| 4,634,954 | 1/1987 | Kato et al. | 322/28 |
| 5,256,959 | 10/1993 | Nagano et al. | 322/25 |
| 5,270,575 | 12/1993 | Togai et al. | 290/40 C |
| 5,483,146 | 1/1996 | Schultz et al. | 322/7 |
| 5,684,370 | * 11/1997 | Watanabe | 318/151 |
| 5,754,030 | * 5/1998 | Maehara et al. | 322/19 |

FOREIGN PATENT DOCUMENTS

| | | | |
|---|---|---|---|
| 0 545 615 A1 | 6/1993 | (EP) | H02P/9/30 |
| 0 789 439 A1 | 8/1997 | (EP) | H02J/7/14 |
| 64-34900 | 3/1989 | (JP) . | |
| 5-180047 | * 7/1993 | (JP) | F02D/41/16 |
| 6-090532 | 3/1994 | (JP) | H02J/7/16 |
| 6-48400 | 6/1994 | (JP) | H02P/9/30 |
| 6-351173 | 12/1994 | (JP) | H02J/7/24 |
| 7-023599 | 1/1995 | (JP) | H02P/9/30 |

* cited by examiner

*Primary Examiner*—Burton S. Mullins
(74) *Attorney, Agent, or Firm*—Sughrue, Mion, Zinn, Macpeak & Seas, PLLC

(57) ABSTRACT

An arrangement including an AC generator 1 whose output voltage is regulated with a control quantity for a field current flowing through a field coil 102 of the AC generator, a switching element 308 for performing on/off-control of the field current flowing through the field coil 102 with a predetermined duty ratio, a voltage detecting means 305 for detecting an output voltage of the AC generator 1, and a gradually increasing control means 4A for increasing gradually a conducting rate by increasing gradually the duty ratio in dependence on the detected output voltage, and a rotation speed detecting means 13 for detecting a rotation speed of the generator 1, wherein the gradually increasing control means 4A is designed to increase the gradually increasing rate of the duty ratio in conformance with increasing of the rotation speed detected by the rotation speed detecting means 13.

5 Claims, 4 Drawing Sheets

CONTROL APPARATUS FOR VEHICLE AC GENERATOR

TECHNICAL FIELD

The present invention relates to a control apparatus for a vehicle-onboard AC generator.

BACKGROUND ART

FIG. 3 is a circuit diagram showing a structure of a control apparatus for a conventional vehicle AC generator which is disclosed, for example, in Japanese Utility Model Registration Application No. 34900, 1989.

Operation of the conventional apparatus will be described by reference to this circuit diagram.

When a key switch 8 is closed upon starting of an engine, a base current flows to a power transistor 308 from a battery 7 by way of the key switch 8, a reverse-current blocking diode 11, a resistor 12 for initial excitation and a base resistor 309 of the power transistor 308, as a result of which the power transistor 308 is turned on, i.e., turned to a conducting state.

When the power transistor 308 is turned on, a field current flows to a field coil 102 from the battery 7 by way of the key switch 8, the reverse-current blocking diode 11, the resistor 12 for initial excitation, the field coil 102 and the power transistor 308, whereby an electric generator 1 is set to the state capable of generating electricity.

When engine operation is started, the generator 1 is rotationally driven, whereby generation of electricity is started. In this state, a divided voltage obtained by dividing a generated voltage of the generator 1 with voltage dividing resistors 301 and 302 is compared with a reference voltage derived from voltage division of a constant voltage supplied from a constant-voltage power source A with voltage dividing resistors 303 and 304 by means of a comparator 305 of a voltage regulator 3. When the divided voltage resulting from the division of the voltage generated by the generator 1 is equal to or lower than the preset reference voltage value resulting from the voltage division of the voltage of the constant-voltage power source A, the comparator 305 assumes a conducting or on-state from a non-conducting or off-state, which results in that a transistor 306 is turned off from the conducting state or on-state.

When the power transistor 308 is turned on, then the field current tends to flow through the field coil 102. However, because the comparator 305 is in the conducting state, the voltage smoothed by a smoothing circuit 4 is discharged to a discharging resistor 405 from a capacitor 404.

In this conjunction, it is noted that the discharging time constant determined by the capacitor 404 and the discharging resistor 405 is large. Consequently, the output of a comparator 601 assumes on- and off-state periodically at a predetermined interval until it is detected that the generated voltage of the generator 1 reaches a predetermined value through comparison of a triangular waveform voltage outputted from a triangular waveform generator 5 with the discharge voltage of the smoothing circuit 4.

As a result of this, a transistor 602 is turned on and off in response to the output of the comparator 601, whereby the power transistor 308 is turned on and off with a predetermined duty ratio to thereby control the field current flowing through the field coil 102 such that generation of the output current of the generator 1 is retarded.

When the output current of the generator 1 has reached a current level equivalent to a load current of a vehicle electric load 9 with the generated voltage of the generator 1 reaching a predetermined value, the output of the comparator 601 assumes on/off levels with such a duty ratio to produce the on/off control of the field current demanded for the output current of the generator 1.

The transistor 602 is turned on/off in response to the output of the comparator 601 to thereby control the power transistor 308 and hence the field current flowing through the field coil 102, as a result of which the generated voltage of the generator 1 is regulated to the predetermined value.

As is apparent from the above, in the case of the conventional apparatus, the resistance value of the charging resistor 402 for the capacitor 404 constituting a part of the smoothing circuit 4 is selected to be small while that of the discharging resistor 405 is selected large. Thus, the value of the time constant for electric charging is set short or small (e.g. not greater than 0.5 sec.), whereas the time constant for electric discharge is set long or large (e.g. not smaller than 0.5 sec.), whereby such operation is ordinarily realized that the output of the comparator 601 becomes substantially equivalent to the output of the comparator 305 which constitutes a part of the voltage detecting circuit.

FIG. 4 shows changes in the generator output voltage waveform in the state where the vehicle-onboard electric load (e.g. headlight) is turned on in response to the turning-on or closing of a switch 10 and changes in the conducting rate of the power transistor 308 in consideration of the discharge characteristic.

In the conventional apparatus such as described above, the charging time constant of the smoothing circuit is set short while the discharging time constant is set long, wherein each of the time constants mentioned above is always set to a fixed value. Consequently, the ration of conduction of the power transistor 308 increases progressively or gradually in dependence on the magnitude of the discharging time constant which is effective when the electric load 9 is turned on and finally reduces a predetermined conducting rate after lapse of a predetermined time. Thus, the generator output voltage falls once temporarily to ΔV1 upon turning-on electric energizing of the electric load 9 and thereafter gradually increases in conformance with the conducting rate of the power transistor 308.

The conventional apparatus is certainly effective for minimizing a decrease of the engine rotation number (rpm) by gradually increasing the output power of the generator when the engine, by which the generator is driven, is in the idling state. However, because the operation of gradually increasing the generator output is effective equally in a high-speed rotation state where the engine output allows a margin, the output voltage of the generator always falls every time the electric load is turned on, which in turn brings about variation in the output states of the loads already set to the on-state such as variation in luminance of lamps installed on instrumentation panels, room lamps, etc. which is of course uncomfortable for the driver, giving rise to a problem.

DISCLOSURE OF THE INVENTION

The present invention has been made with a view to solving the problem as mentioned above, and thus as object of the present invention is to provide a control apparatus for a vehicle AC generator which is capable of lengthening a time period during which the field duty (i.e., duty ratio of the field current) gradually increases, to thereby minimize a reduction of the engine rotation number upon turning-on of an electric load, while shortening a time period during which the field duty (i.e., duty ratio of the field current) is gradually increased, to thereby minimize reduction of the generator output voltage when the electric load is turned on.

BEST IMPLEMENTATION MODE FOR CARRYING OUT THE INVENTION

Figure 1:
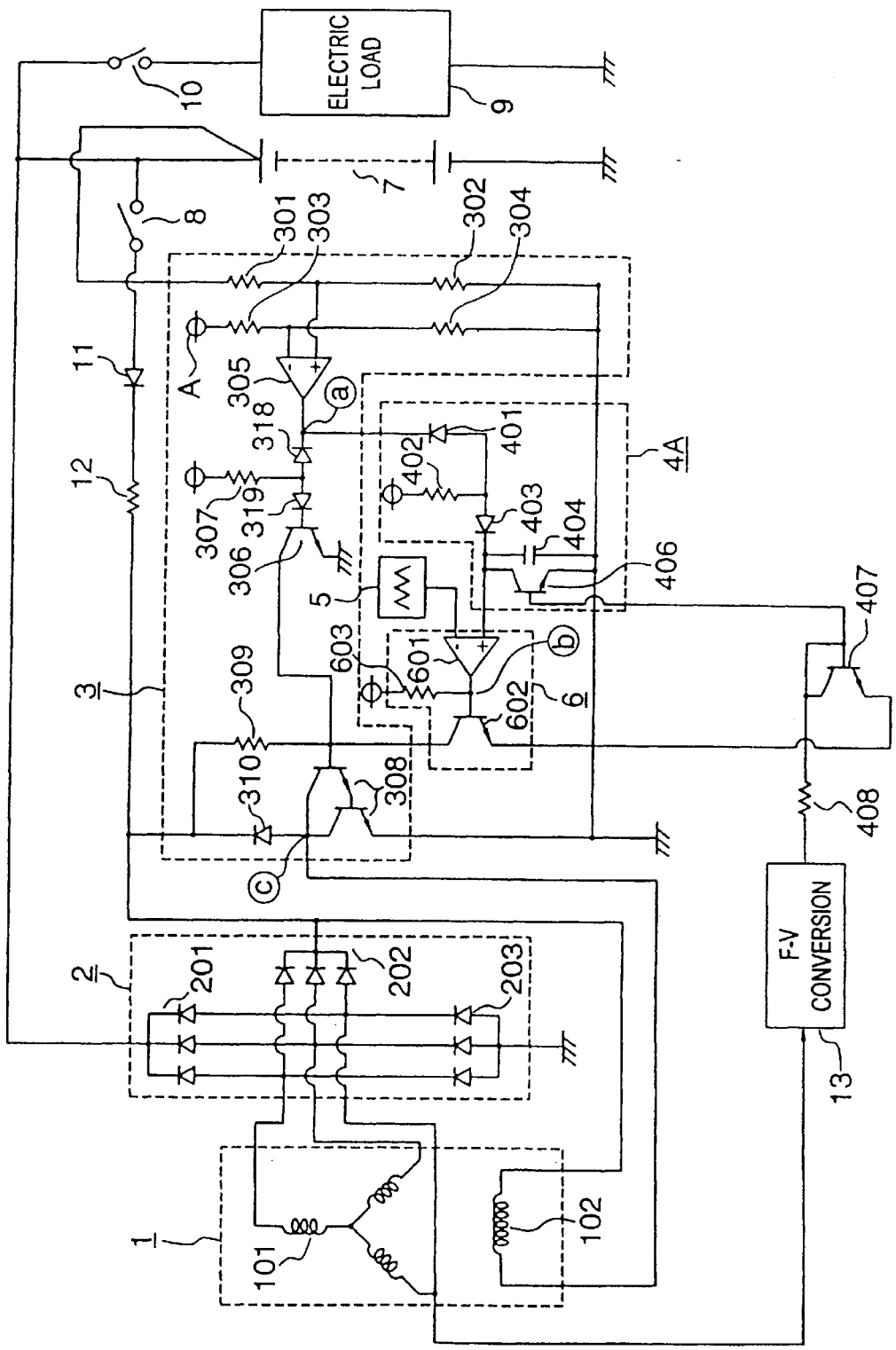
FIG. 1 is a view showing a structure of a control apparatus for a vehicle-onboard AC generator according to a first implementation mode of the present invention.

FIG. 1 is a diagram showing a structure of a control apparatus for a vehicle-onboard AC generator according to a first implementation mode of the invention concerned. In the figure, same reference numerals as those used in FIG. 3 denote same or equivalent parts. Shown in FIG. 2 at (a) is a characteristic diagram for illustrating a relation between a generator output voltage and a conducting rate of a power transistor in an idling operation state of an engine, while shown in the same figure at (b) is a characteristic diagram for illustrating a relation between a generator output voltage and a conducting rate of the power transistor in a moderate-speed rotation state of the engine, and shown in the same figure at (c) is a characteristic diagram for illustrating a relation between an output voltage of the generator and a conducting rate of the power transistor in a high-speed rotation state of the engine.

Referring to FIG. 1, reference numeral 13 denotes a F-V converter which constitutes a rotation speed detecting means. This F-V converter 13 is designed for detecting a rotation frequency of the generator 1 on the basis of a frequency of an AC voltage induced in the armature coil 101 to thereby convert the rotation frequency (F) into a DC voltage (V). The DC voltage (V) resulting from the conversion assumes a large value in proportion to the rotation frequency (F).

Reference numeral 407 denotes an NPN transistor which constitutes a part of a constant-current circuit. This NPN transistor 407 has an emitter electrode connected to the ground of the apparatus, while collector and base electrodes thereof are connected in common to an output voltage terminal of the F-V converter 13 via a current limiting resistor 408.

Further, in a smoothing circuit 4A of the apparatus according to the instant implementation mode of the invention, a transistor 406 is employed in place of the discharging resistor 405, wherein the collector and the emitter of the transistor 406 are connected in parallel to the capacitor 404 with the base of the transistor 406 being connected to that of the NPN transistor 407.

Figure 2:
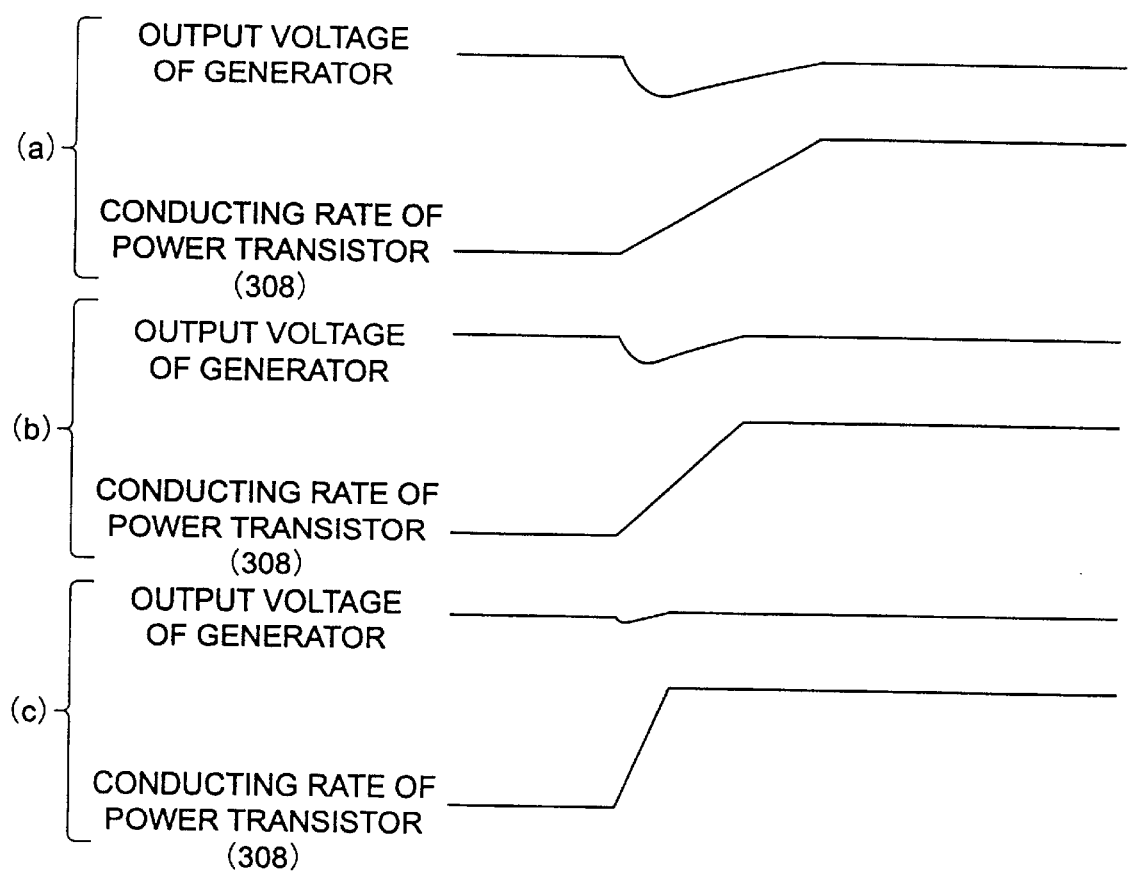
FIGS. 2(a) to 2(c) are characteristic diagrams for illustrating relations between generator output voltage and conducting rate of a power transistor in the apparatus according to the first implementation mode of the invention.
Figure 3:
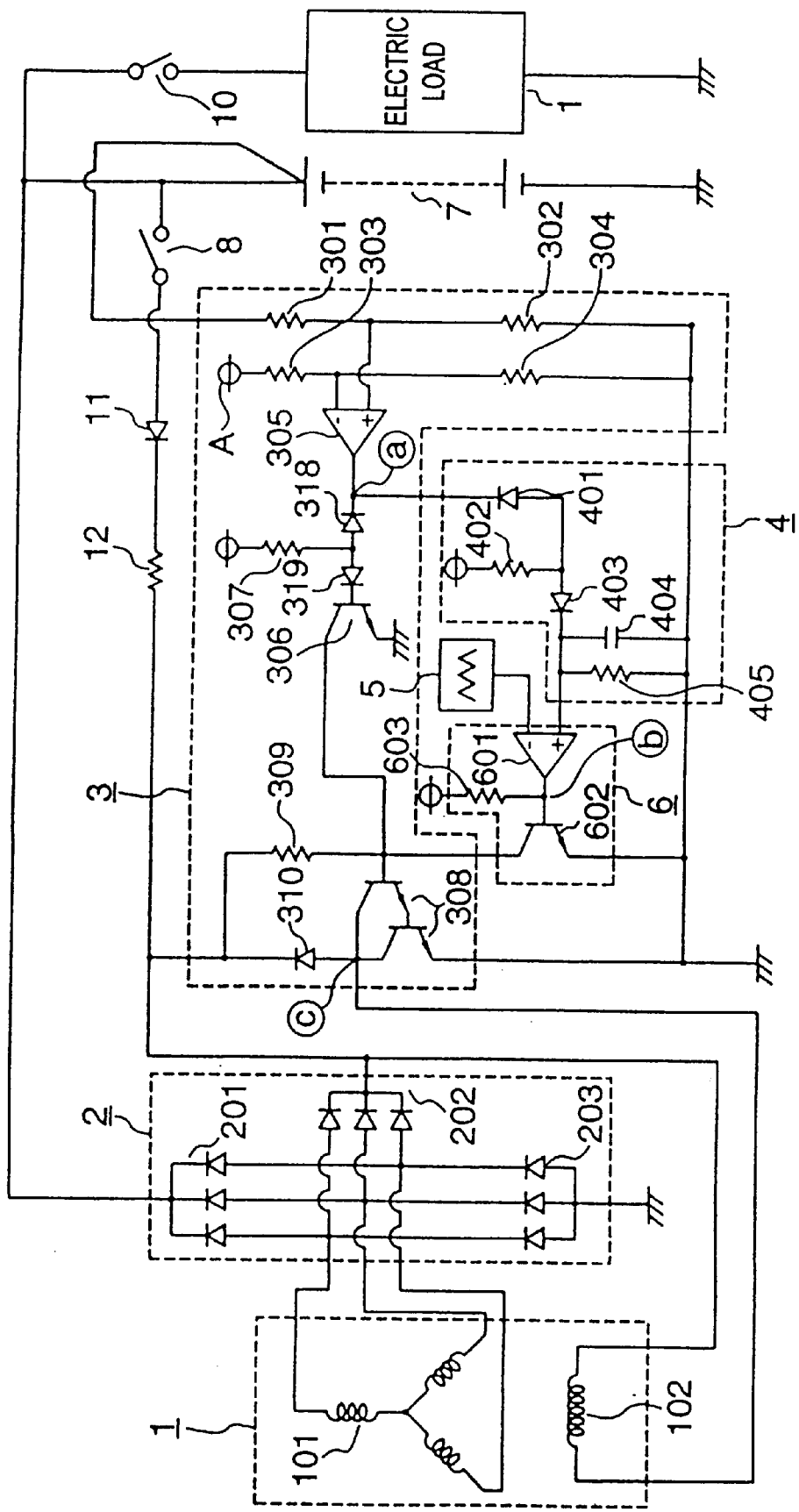
FIG. 3 is a view showing a structure of a conventional control apparatus for a vehicle-onboard AC generator.
Figure 4:
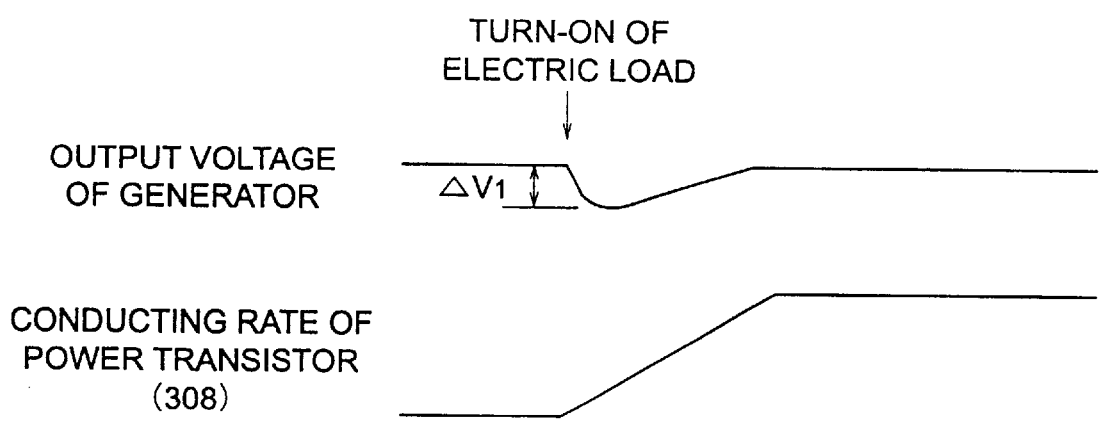
FIG. 4 is a characteristic diagram for illustrating relations between generator output voltage and conducting rate of a power transistor in the conventional apparatus.

Next, operation of the apparatus according to the instant implementation mode will be described by reference to FIG. 1 and FIG. 2.

At first, assuming that the electric load 9 is electrically energized by turning on the switch 10 when the engine rotation number is low as in the case of idling of the engine, the conducting rate of the power transistor is so regulated as to minimize reduction of the engine rotation number by lengthening the time period during which the field duty is gradually increased.

To this end, the F-V converter 13 serves for detecting the rotation frequency of the generator 1 in the idling state of the engine, to thereby convert the rotation frequency into a DC voltage which is then applied to the base of the transistor 407 constituting a part of the constant-current circuit by way of the current limiting resistor 408.

The NPN transistor 407 allows a constant current determined by the current limiting resistor 408 and the voltage value resulting from the conversion to flow to the base of the transistor 406 which constitutes a part of the smoothing circuit 4A.

When the current flows to the base of the transistor 406, electric charges stored in the capacitor 404 are discharged as a collector current, as a result of which a discharge voltage is applied to an inversion input terminal of the comparator 601. In that case, because the collector current is small and thus the discharge voltage rises only gently, the discharging time constant may be regarded to be large.

The transistor 602 is periodically turned on and off with the ON/OFF duty ratio being gradually increased until it is detected that the output voltage of the generator 1 has reached a predetermined value through comparison of the discharge voltage of the smoothing circuit 4 and the triangular waveform voltage generated by the triangular waveform generator 5.

As a result of this, the power transistor 308 is also turned on and off in conformance with the turn-on/off operation of the transistor 602. The field current flowing through the field coil 102 thus undergoes on/off control by means of the power transistor 308, whereby the output voltage of the generator 1 is caused to increase or rise gradually and gently up to a predetermined value in conformance with the discharge characteristic determined by the discharging time constant, as a result of which decreasing of the engine rotation can be reduced.

On the other hand, upon power-on of the electric load 9 at a time point at which the engine rotation speed has reached the moderate speed after lapse of a predetermined time from starting of the engine, the converted voltage outputted from the F-V converter 13 and having higher level than that in the idling operation state is inputted to the constant-current circuit, whereby the base current at the moderate-speed operation state of the engine is fed to the base of the transistor 406 as the base current, as illustrated in the same figure at (b).

Due to the base current of the transistor 406 which is larger than that in the idling operation state, the electric charges stored in the capacitor 404 are discharged speedily. Thus, the rate of change of the discharge voltage as a function of time assumes a greater value than that in the idling operation state. Thus, the discharging time constant may be regarded smaller than that in the idling operation state.

The transistor 602 is periodically turned on and off with the ON/OFF duty ratio being gradually increased during a shorter time period than that in the idling operation state until it is detected that the output voltage of the generator 1 has reached the predetermined value through comparison of the discharge voltage of the smoothing circuit 4 and the triangular waveform voltage generated by the triangular waveform generator 5.

As a result of this, the power transistor 308 is also turned on and off in conformance with the turn-on/off operation of the transistor 602. The field current flowing through the field coil 102 thus undergoes on/off control by the power transistor 308, whereby the output voltage of the generator 1 is caused to increase or rise gradually and gently up to the predetermined value in accordance with the discharge characteristic determined by the discharging time constant, as a result of which decreasing of the output voltage of the generator can be reduced.

On the other hand, as shown in the same figure at (c), upon power-on of the electric load 9 at a time point at which the engine rotation speed has reached a high speed after lapse of a predetermined time from the start of the engine operation, the converted voltage outputted from the F-V converter 13 and having higher level than that in the moderate speed operation state is inputted to the constant-current circuit, whereby the constant current in the high-speed operation state of the engine is fed to the base of the transistor 406 as the base current.

Because the constant current which is larger than that in the moderate-speed operation state flows to the base of the transistor 406, the electric charges stored in the capacitor 404 are discharged speedily. Thus, the rate of change of the discharge voltage as a function of time lapse assumes a greater value than that in the moderate-speed operation state of the engine. Thus, the discharging time constant may be regarded smaller than that in the moderate-speed operation state.

The transistor 602 is periodically turned on and off with the ON/OFF duty ratio being rapidly increased until it is detected that the output voltage of the generator 1 has reached the predetermined value through comparison of the discharge voltage of the smoothing circuit 4 and the triangular waveform voltage generated by the triangular waveform generator 5.

As a result of this, the power transistor 308 is also turned on and off with the duty ratio which conforms with the on/off operation of the transistor 602. The field current flowing through the field coil 102 thus undergoes on/off control by the power transistor 308, whereby the output voltage of the generator 1 is caused to increase or rise rapidly up to the predetermined value in accordance with the discharge characteristic determined by the discharging time constant, as a result of which decreasing or fall of the generator output voltage can be reduced when compared with that in the moderate-speed rotation state of the engine.

Industrial Applicability

According to the present invention, the rate at which the generator output voltage gradually increases conforms to an increased rotation speed of the generator, which in turn depends on the engine rotation number. During the low speed operation state of the engine, the time period during which the generator output voltage gradually increases is lengthened to thereby minimize reduction of the engine rotation, whereas in the high-speed operation state of the engine, the time period during which the generator output voltage gradually increases in shortened to thereby minimize lowering of the generator output voltage.

What is claimed is:

1. A control apparatus for a vehicle AC generator comprising:
    an AC generator having an output voltage regulated by controlling a quantity of a field current flowing through a field coil of said AC generator;
    a voltage regulator having a transistor connected to said field coil for performing on/off-control of the field current flowing through said field coil with a predetermined duty ratio;
    a frequency-voltage converter connected to an armature coil of said AC generator for detecting a rotation frequency of said AC generator and converting the rotation frequency to a voltage;
    a constant current circuit having a transistor with base and collector electrodes which receive the voltage output from said frequency-voltage converter; and
    a smoothing circuit having a transistor operative to discharge a voltage, wherein the collector and emitter electrodes of the transistor connected in parallel to a capacitor and a base electrode connected to the base and collector electrodes of the constant current source, wherein a discharging time constant of said smoothing circuit decreases as the rotation speed detected by said frequency-voltage converter increases, and
    wherein the output voltage of said AC generator increases gradually up to a predetermined value in conformance with the discharge characteristics of the discharging time constant.

2. A control apparatus for a vehicle AC generator comprising:
    an AC generator whose output voltage is regulated by controlling a quantity of a field current flowing through a field coil of the AC generator;
    a switching element for performing on/off-control of the field current flowing through said field coil with a predetermined duty ratio;
    voltage detecting means for detecting an output voltage of said AC generator;
    rotation speed detecting means for detecting a rotation speed of said generator; and
    control means for gradually increasing a conducting rate of said switching element by gradually increasing said duty ratio in dependence on the detected output voltage, said control means further comprising:
        a smoothing circuit which outputs a discharge voltage, and is operative to smooth the detected voltage of the voltage detecting means and to decrease a discharging time constant as the rotation speed detected by the rotation speed detecting means increases;
        triangular waveform generating means for generating a triangular waveform voltage; and
        comparing means for comparing said discharge voltage of said smoothing circuit with said triangular waveform voltage, to thereby output an on/off control signal for the switching element,
    wherein said control means is operative to gradually increase said duty ratio in conformance with an increase in the rotation speed detected by said rotation speed detecting means.

3. A control apparatus for a vehicle AC generator as set forth in claim 2, characterized in that the rotation speed detecting means comprises a frequency-voltage converter for converting a rotational frequency into a voltage indicative of the rotation speed.

4. A control apparatus for a vehicle AC generator comprising:
    an AC generator whose output voltage is regulated by controlling a quantity of a field current flowing through a field coil of the AC generator;
    a switching element for performing on/off-control of the field current flowing through said field coil with a predetermined duty ratio;
    voltage detecting means for detecting an output voltage of said AC generator;

control means for gradually increasing a conducting rate of said switching element by gradually increasing said duty ratio in dependence on the detected output voltage;

rotation speed detecting means for detecting a rotation speed of said generator, wherein the control means further comprises:
  a smoothing circuit operative to smooth the detected voltage of the voltage detecting means and to decrease a discharging time constant as the rotation speed detected by the rotation speed detecting means increases;
  triangular waveform generating means for generating a triangular waveform voltage; and
  comparing means for comparing a discharge voltage of said smoothing circuit with said triangular waveform voltage, to thereby output an on/off control signal for the switching element, wherein said control means is operative to gradually increase said duty ratio in conformance with an increase in the rotation speed detected by said rotation speed detecting means; and wherein the smoothing circuit further comprises:
  a constant-current circuit with a current level that increases with an increase in the rotation speed of said generator; and
  a smoothing capacitor, wherein a rate at which voltage is discharged from the smoothing capacitor increases as said current value increases.

5. A control apparatus for a vehicle AC generator as set forth in claim 4, characterized in that the charge or discharging time constant of the smoothing circuit is not less than 0.5 second.

* * * * *